United States Patent [19]
Fritschel

[11] 3,856,721
[45] Dec. 24, 1974

[54] SYNTACTIC FOAMS AND THEIR PREPARATION

[75] Inventor: Larry Edwin Fritschel, Cuyahoga Falls, Ohio

[73] Assignee: The Firestone Tire & Rubber Company, Akron, Ohio

[22] Filed: Oct. 16, 1973

[21] Appl. No.: 406,793

[52] U.S. Cl.... 260/2.5 B, 260/2.5 HA, 260/2.5 HB, 260/42.37, 260/42.47, 260/66, 260/85.1, 260/94.7 A, 260/876 R, 260/879, 260/880 R, 260/887, 260/889, 260/893
[51] Int. Cl.... C08d 13/08, C08d 5/02, C08d 11/04
[58] Field of Search............ 260/85.1, 94.7 A, 2.5 B

[56] References Cited
UNITED STATES PATENTS

| | | | |
|---|---|---|---|
| 3,384,629 | 5/1968 | Strobel........................... | 260/94.7 A |
| 3,594,361 | 7/1971 | Parris et al..................... | 260/94.7 A |
| 3,635,933 | 1/1972 | Schaffhauser et al. ........ | 260/94.7 A |
| 3,635,934 | 1/1972 | Schaffhauser et al. ........ | 260/94.7 A |
| 3,786,087 | 1/1974 | Conard et al.................. | 260/94.7 A |

*Primary Examiner*—Morton Foelak

[57] ABSTRACT

A syntactic foam is produced by a controlled curing of a polymer which is a homopolymer of butadiene or a copolymer of butadiene and styrene or the like, at least 40% of which polymer is butadiene and at least 80% of the repeating butadiene units are of the 1,2-configuration. Instead of styrene, a methyl or ethyl derivative may be used. The syntactic foam includes minute hollow spheres which give strength to the foam product and the syntactic foam product has a very low density.

9 Claims, 4 Drawing Figures

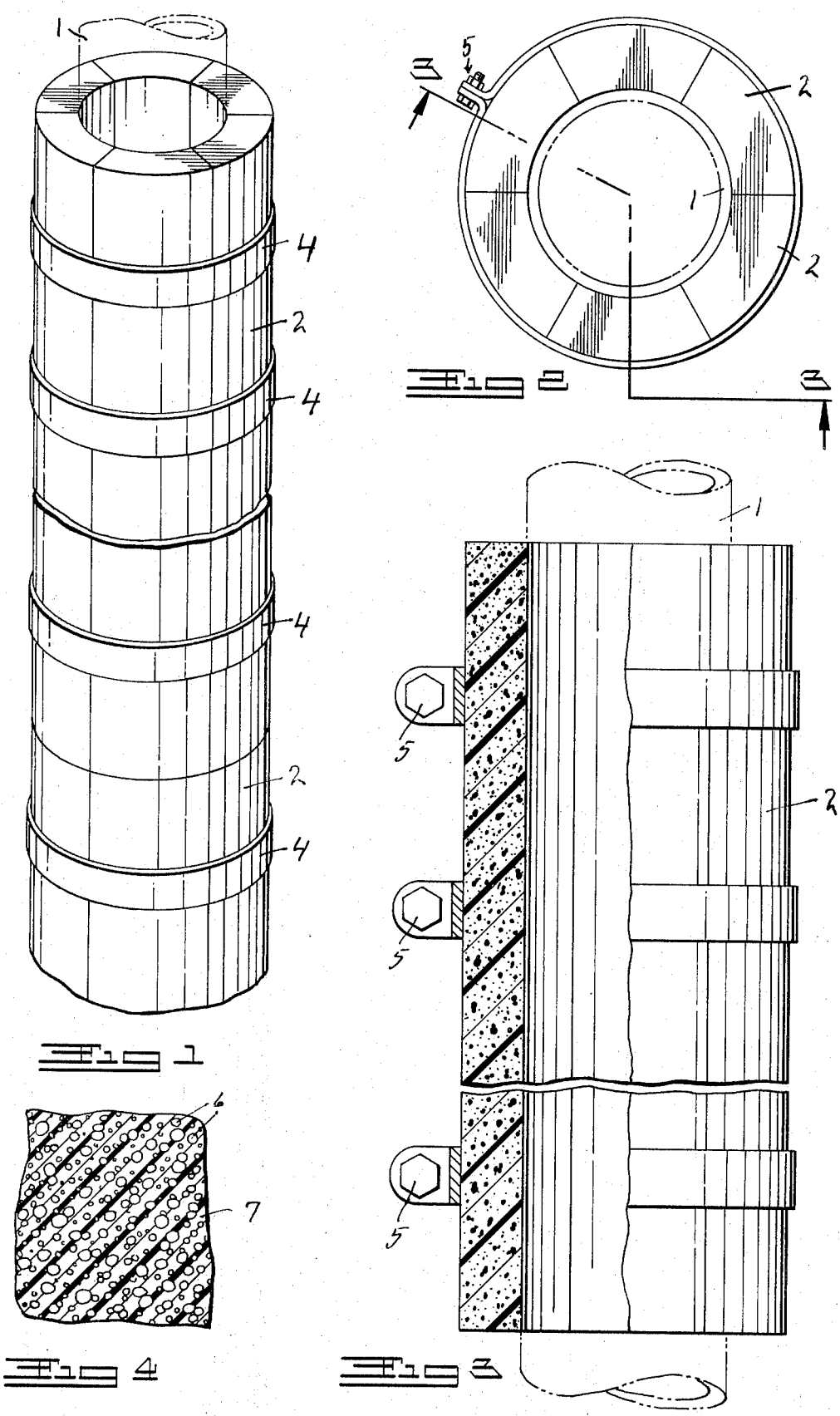

3,856,721

SYNTACTIC FOAMS AND THEIR PREPARATION

FIELD OF THE INVENTION

Syntatic foams are known in the art. The ASTM definition of a syntactic foam is "material consisting of hollow sphere fillers in a resin matrix." The foams are used in deep-submergence vehicles, instrument packaging and electronic gear, cable buoys, floatation collars for deep-water drilling operations, etc. By using the curing system disclosed and claimed herein, improved syntactic foams are produced.

The polymeric material used in the production of syntactic foam when subjected to ordinary curing conditions is unusually exothermic and the heat build-up is so great in moderate or large-sized sections that unless it is controlled, the polymeric material becomes charred. This charring leads to severe strength reduction and an unusable product. By the controlled curing of this invention, charring is prevented. Syntactic foams of relatively low density can be produced.

BACKGROUND OF INVENTION

Syntactic foams are known. They are discussed, for instance, in "Here's What's Happening in High Performance Syntactic Foams" by Roger W. Johnson in Plastics Design and Processing for April, 1973 on pages 14–17.

The polymeric material of this invention is subjected to a two-stage cure. The first stage being a low-temperature curing system utilizing methylethyl ketone (MEK) peroxide or other peroxides used in lower-temperature cures, cobalt naphthenate, iron naphthenate, and acetylacetone (pentanedione) or the like; the peroxide used in the second stage requiring a higher temperature for activation.

The curing of polyesters by peroxide combinations with cobalt naphthenate and iron naphthenate is known in the art and is disclosed in "Accelerators for Peroxide Curing of Polyesters" by Brinkman et al. on pages 167–172 of Modern Plastics for October, 1968.

Conard, Ser. No. 406,792 filed Oct. 16, 1973 discloses the use of cobalt and iron naphthenates, generally in larger amounts than disclosed herein in a two-stage peroxide curing of the polymer to which this invention relates, together with pentanedione as an activator, but more particularly for the curing of thin films, the mixture of the two naphthenates being used to provide a tack-free product.

SUMMARY OF INVENTION

Syntactic foams are formed of polymeric materials which include hollow spheres (microspheres), and if the temperature used in preparing the foam is sufficiently high to melt the spheres, the bubbles formed due to the presence of the spheres, are surrounded by melted remains of the spheres.

The polymeric material used in producing the syntactic foam of this invention is a resinous polymer of the class consisting of (1) homopolymers of butadiene or (2) copolymers of butadiene and styrene or a methyl or ethyl derivative of styrene such as alpha-methyl styrene or vinyl toluene, etc. At least 40% by weight of the polymeric material is butadiene, and at least 80% of the repeating butadiene units are of the 1,2-configuration.

Where foams of high strength are required, smaller microspheres are preferred, such as spheres measuring 20 to 300 or 400 or perhaps 500 microns in diameter and where strength is not critical, larger spheres may be used such as spheres measuring ½ inch up to 1 inch or more in diameter. Spheres of any size within these limits may be used. Thin-walled glass spheres are preferred for many operations where strength and thermal resistance are important, but spheres of other compositions including polyethylene, ABS, polymethyl methacrylate, and other plastics, both low-temperature and high-temperature-softening plastics, may be used. Even though the spheres are of such a composition as to be melted during the second stage of the cure, the effectiveness of the spheres is not materially reduced because during the first stage of the cure the structure of the foam is set. Therefore, the porosity of the syntactic foams used may be due to the presence of hollow beads, but the voids may be surrounded by the remains of the bead compositions. The foams must be substantially free from other bubbles of air or gas if maximum strength is desired.

The Cure

The loading of the foam will depend upon the size of the spheres used. For the stronger foams smaller beads are preferred and maximum strength is obtained when the loading of the smaller beads is between 75 and 100 parts per hundred weight of resin. Where strength is not so important, 30 to 50 parts of the larger beads may be used. Thus, the foam may include from 30 to 100 parts per 100 parts by weight of the resin. The weight of the larger spheres used in syntactic foams is progressively reduced as the size of the spheres increases.

The foam is produced by a two-stage cure. The first stage is carried out at about room temperature, any temperature between 50° and 150° F. being satisfactory and temperatures between 65° and 95° F. being preferred.

In the first stage, the cure is accomplished with a peroxide curing agent which decomposes at the temperature of the cure which is not over about 150° F., and MEK peroxide is preferred. Other peroxides including bis(4-t-butyl cyclohexyl)-peroxydicarbonate, lauroyl peroxide, benzoyl peroxides, etc. may be used. The cure is effected without appreciable gas evolution because there is no substantial decomposition of the polymeric material during the cure. The amount of this peroxide employed will depend upon the size of the product produced. For larger articles about 0.2 to 0.5 parts of MEK peroxide per 100 parts of the monomer-extended resin will be used and for smaller articles, a somewhat larger amount will normally be employed, up to perhaps 5.0 parts per 100 parts of the monomer-extended resin. Thus, from substantially 0.2 to 5.0 parts of the lower-temperaturue-curing peroxide may be used.

The activators used in the controlled curing to which this invention relates are iron and cobalt naphthenates. The ratio of the amount of the cobalt naphthenate to the iron naphthenate is about 3–5/1. Five to 20 parts of cobalt naphthenate are used per 100 parts of the lower-temperature-curing peroxide used in the first stage of the cure.

The first stage of the cure utilizes pentanedione. (acetylacetone) or its equivalent as an accelerator. Substantially 10 to 30 parts of the accelerator, and preferably about 20 parts, are used per 100 parts of the low-temperature-curing peroxide. The pentanedione accelerates the decomposition of the metal naphthenates which in turn activate the peroxide. The pentanedione is not active without the metal naphthenates.

The length of the induction period leading up to the first stage of the cure will depend upon the amount of the lower-temperature-curing peroxide, accelerator and activator employed. Using a minimum amount of accelerator, the induction period may be as long as 5 days. Commercially, an induction period of about 3–5 hours is preferred. At the end of the induction period, the final temperature will rise to a temperature determined by the size of the product being cured. For smaller products the temperature will not reach the activation temperature of the second stage peroxide. For larger products, the heat build-up due to the first stage peroxide exotherm may be sufficient to activate the higher temperature peroxide. In the larger products, the levels of the curing agents are so adjusted that the heat build-up is slow and gradual and although it may activate the second stage peroxide, it should not be sufficient to adversely affect the polymer. By such control of the curing which prevents temperature build-up to the point where charring or degradation of polymer occurs, it is possible to cure products of substantial thickness such as products which are eight inches or more in thickness. Unless the curing is controlled, the heat build-up in such thick products, due to the peroxide curing, is such that charring or degradation occurs to the extent that it reduces the strength of the product.

The second stage of the cure is effected by a peroxide which is activated only at a higher temperature, e.g. 175° to 375° F. Unless the first stage is controlled so that this higher temperature is not reached until the desired state of a cure has been attained by the lower-temperature-curing peroxide, the higher-temperature-curing peroxide used in the second stage will quickly generate sufficient heat to cause decomposition or charring of the polymeric material.

The peroxide activated in the second stage of the cure is a high-temperature-curing peroxide such as t-butyl perbenzoate, dicumyl peroxide, cumene hydroperoxide, etc. If the second stage cure has not been activated by the lower-temperature-curing peroxide, curing may be effected by placing the material in an oven or otherwise heating it at a temperature necessary to activate the high-temperature-curing peroxide. The level of high-temperature-curing peroxide necessary to achieve the desired final state of cure may vary from 0.1 to 5.0 parts per 100 parts of monomer-extended resin.

The examples illustrate the two separate stages of the cure in which additional heat is applied in the second stage as well as examples in which the control of the first stage of the cure provides sufficient generation of heat to initiate or activate the second stage of the cure. The examples in which the second stage of the cure is initiated by further heating may be applied to small articles and the other type of cure in which additional heating is not necessary will be applied to large articles such as floatation collars, for instance. Such a collar is illustrated in the accompanying drawing.

In the drawing:

FIG. 1 is a foreshortened prospective view of a floatation collar for a drilling ring;

FIG. 2 is an end view of the showing in FIG. 1;

FIG. 3 is an enlarged foreshortened section on the line 3—3 of FIG. 2; and

FIG. 4 is an enlarged detail of a section through the collar.

The pipe 1 is a pipe to be driven into the bottom of a body of water. It may be 2 to 3 feet in diameter. The drilling equipment is lowered into it. The pieces 2 of syntactic foam each cover a portion of the exterior pipe which is no larger than to cover a 180° portion of the pipe exterior, and usually about 60° to 90°. Each of the sections 2 covers 60° of the pipe surface. The pipe may be 50 feet long and such a section may weigh several hundred pounds. Two sections which encircle the pipe are shown in FIG. 1 which come together at the line 3. There is no need for adhering such adjoining sections.

Each section is about 8 to 20 inches thick. It displaces a substantial amount of water and thus the density of the assembly is materially less than that of the pipe alone. This is the objective of the collar.

The several sections of collar which enclose each portion of the pipe are bonded together, as by the strap 4, the outwardly bent ends of which are held together by bolts and nuts 5.

Each section is composed of microspheres 6 dispersed in the plastic 7.

EXAMPLES

In the examples, the iron and cobalt naphthenates are used in solutions which contain 6% of the metal ions in the respective materials. The MEK peroxide is used as a solution of 60% MEK peroxide in dimethylphthalate (Lupersol DDM). The extra strength microspheres (which are relatively large) to which the examples refer are Q-Cel inorganic microspheres manufactured by Philadelphia Quartz Co. The glass microspheres are smaller and are B–30–B microspheres manufactured by Minnesota Mining Company. Larger beads may be used. Also, mixtures of small microspheres with large beads, omitting substantially all beads of intermedial size, very low density products are obtained which have good strength. The polymeric material to which the invention relates and which is disclosed above is utilized as monomer-extended resin. Other monomers reactive with the polymer may be utilized such as divinyl benzene, triallyl cyanurate, styrene, etc.

The recipes for several products are given in Table I, and the conditions under which the products were cured and their compressive strengths are given in Table II.

TABLE I

| | Compounding Recipes | | | | | |
|---|---|---|---|---|---|---|
| EXAMPLE NO. | 1 | 2 | 3 | 4 | 5 | 6 |
| Monomer-Extended Resin* | 80 | 80 | 80 | 80 | 80 | 80 |
| Vinyl Toluene | 20 | 20 | 20 | 20 | 20 | 20 |
| Sartomer 350** | 3.4 | 3.4 | 3.4 | 2.0 | 2.0 | 2.0 |
| Silane Z-6075*** | 1.0 | 1.0 | 1.5 | 1.0 | 1.0 | 1.0 |
| Cobalt Naphthenate | .068 | .04 | .04 | .04 | .032 | .04 |
| Iron Naphthenate | .015 | .015 | .015 | .015 | .012 | .015 |

TABLE I — Continued

Compounding Recipes

| EXAMPLE NO. | 1 | 2 | 3 | 4 | 5 | 6 |
|---|---|---|---|---|---|---|
| Extra Strength Microspheres | 20 | 20 | 20 | — | — | — |
| Glass Microspheres | — | — | — | 44.5 | 44.5 | 44.5 |
| Lupersol DDM (60% MEK Peroxide) | 2.0 | 1.0 | .5 | .5 | .4 | .5 |
| Pentanedione | .4 | .2 | .1 | .1 | .08 | .1 |
| t-butyl perbenzoate | .75 | .75 | .75 | .75 | .75 | .75 |

\* - 65 parts of butadiene-styrene (60/40) and 35 parts of vinyl toluene, the copolymer having a dilute solution viscosity of 0.3.
\*\* - Trimethylolpropane trimethacrylate
\*\*\* - Vinyltriacetoxysilane

TABLE II

Curing Conditions and Properties

| EXAMPLE NO. | 1 | 2 | 3 | 4 | 5 | 6 |
|---|---|---|---|---|---|---|
| Sample Size | 1 gallon | 1 gallon | 1 gallon | 1 gallon | 1 cu. ft. | 1 cu. ft. |
| 1st Stage Cure | 16 hrs. at 72° F. | 16 hours at 72° F. | 16 hours at 72° F. | 16 hours at 72° F. | 120 hours at 72° F. | 16 hours at 72° F. |
| Peak Temperature | 290° F. | 240° F. | 200° F. | 150° F. | 290° F. | 290° F. |
| Compressive Strength, psi | 1588 | 2965 | 592 | 237 | 4183 | 5371 |
| 2nd Stage Cure | 4 hours at 250° F. | 4 hours at 250° F. | 4 hours at 250° F. | 6 hours at 250° F. | None | 24 hours at 250° F. |
| Peak Temperature | 250° F. | 260° F. | 300° F. | 280° F. | — | 250° F. |
| Compressive Strength, psi | 2729 | 4060 | 5158 | 6734 | — | 5234 |
| Density lbs./cu. ft. | 36.0 | 36.0 | 36.0 | 34.2 | 34.2 | 34.2 |

The peak temperatures refer to temperature within the material being cured. The peak temperatures obtained in Examples 1 and 2, during the first stage of the cure, were sufficient to activate the higher-temperature-curing peroxide used in the second stage of the cure. This resulted in continuation of the cure effected by the lower-temperature-curing peroxide. The products of the first four examples were small, measuring no more than substantially 8 inches in the largest dimension, and actually were small cylinders measuring 6½ inches in diameter and 7 inches in height. As is clear from the information given in Table II, some of the higher-temperature-curing peroxide was decomposed and used up in the first stage of the cure. The final compressive strength was lower than in Examples 3 and 4. The peak temperatures reached in the first stage in Examples 3 and 4 did not activate the higher-temperature-curing peroxide which was active in the second stage of the cure. Examples 1–4 were then heated in an oven at 250° F. for the indicated periods to effect the second stage of the cure. Comparing the data in the table which refers to the first four examples, it is evident that in the first two examples the higher-temperature-curing peroxide was somewhat activated in the first stage of the cure, whereas in the third and fourth cures, it was not activated during the first stage of the cures. By use of all of the high-temperature-curing peroxide in the second-stage cure in examples 3 and 4, high compressive strengths were obtained in the final products, much greater than those obtained in examples 1 and 2 in which some of the high-temperature-curing peroxide had been activated during the first stage of the cure.

The larger samples of Examples 5 and 6 retained the heat generated during the cure in the first stage so that the high-temperature-curing peroxide was activated by the first-stage peroxide. This was not accomplished until the first stage of the cure had reached such a point that the activation of the second-stage peroxide did not cause an uncontrollable exotherm.

The density of the syntactic foams may be varied by using beads of different sizes and in different amounts. For a low density foam, it is necessary to use large beads and they may be used in larger and smaller amounts. Foams containing only small beads, i.e. microspheres less than about 200 microns in the largest dimension, the amount of the beads being 85 to 100 parts per 100 parts of the resin, have a density of between 36 and 32 pounds per cubic foot and a compression strength greater than 4,000 pounds up to and over 5000 pounds per square inch. As stronger microspheres are developed, foams with a density as low as 25 to 30 pounds per cubic foot will be produced, using the curing system disclosed herein. Example 6 is illustrative of the manufacture of such a foam. Foams of such properties, having a compression strength of over 5,000 pounds per square inch and measuring over 8 inches in the smallest dimension are believed to be new regardless of the polymer utilized.

I claim:

1. The process of producing a syntactic foam which comprises curing in two stages a monomer-extended resinous polymeric composition in which are dispersed substantially 30 to 100 parts of microspheres per 100 parts of the polymer, the microspheres measuring substantially 20 microns to 1 inch in diameter, the size and amount of the microspheres being selected to produce a commercial foam, the polymeric material being at least largely a polymer selected from the class consisting of (a) homopolymers of butadiene and (b) copolymers of styrene and methyl and ethyl derivatives of styrene, in which at least 40% by weight is butadiene and at least 80% of the repeating butadiene units being of the 1,2-configuration, 100 parts of said polymeric material being compounded with 0.2 to 5 parts of a low-temperature-curing peroxide curing agent, 0.1 to 5 parts of a high-temperature-curing peroxide curing agent, a mixture of 3–5 parts of cobalt naphthenate to 1 part of iron naphthenate with 5 to 20 parts of cobalt naphthenate per 100 parts of the low-temperature-curing peroxide, and 10 to 30 parts of acetylacetone as a curing accelerator per 100 parts of the low-temperature-curing peroxide; in the first stage, curing at a temperature of 50° to 150° F. until the polymer sets, without substantial heat-degradation of the polymeric material, and thereafter, in the second stage, completing the cure at a temperature of 175° to 375°F at which the higher-temperature-curing peroxide is effective.

2. The process of claim 1 in which the article of the polymeric composition is of such large dimensions that the heat retention is sufficient to initiate activation of the high-temperature-curing peroxide sufficiently to complete the cure without supplying additional heat.

3. The process of claim 1 in which the article of the polymeric composition is of such small dimensions that the loss of heat during the first stage of the cure is sufficient to prevent an activation of the high-temperature-curing peroxide, and heat is necessarily applied to complete the second stage of the curing with the high-temperature-curing peroxide.

4. The process of claim 1 in which methylethyl ketone peroxide is used in the first stage of the cure.

5. The process of claim 1 in which t-butyl perbenzoate peroxide is used in the second stage of the cure.

6. The process of claim 1 in which the microspheres measure substantially 20 to 500 microns in the largest dimension and 75 to 100 parts by weight of microspheres are used per 100 parts of the polymer.

7. The process of claim 1 in which the hollow beads measure 500 microns to 1 inch in diameter and 30 to 500 parts are used per 100 parts of the polymer.

8. A syntactic foam produced by the process of claim 1, which foam has a density of 25 to 36 pounds per cubic foot and a compression strength of over 4,000 pounds per square inch.

9. A syntactic foam produced by the process of claim 1 which foam has a density of 36 to 32 pounds per cubic foot, a compression strength of over 5,000 pounds per square inch and measures greater than 8 inches in the smallest dimension.

* * * * *